United States Patent
Foster et al.

(10) Patent No.: US 6,964,701 B2
(45) Date of Patent: Nov. 15, 2005

(54) AZO DYES CONTAINING A BARBITURIC ACID MOIETY, INK-JET PRINTING INKS AND PROCESSES

(75) Inventors: Clive Edwin Foster, Blackley (GB); Helen Ava O'Shaughnessy, Blackley (GB); Peter Gregory, Bolton (GB)

(73) Assignee: Avecia Limited, Manchester (GB)

( * ) Notice: Subject to any disclaimer, the term of this patent is extended or adjusted under 35 U.S.C. 154(b) by 61 days.

(21) Appl. No.: 10/471,544

(22) PCT Filed: Mar. 7, 2002

(86) PCT No.: PCT/GB02/00973

§ 371 (c)(1),
(2), (4) Date: Sep. 11, 2003

(87) PCT Pub. No.: WO02/072715

PCT Pub. Date: Sep. 19, 2002

(65) Prior Publication Data

US 2004/0112251 A1 Jun. 17, 2004

(30) Foreign Application Priority Data

Mar. 14, 2001 (GB) .............................................. 0106343

(51) Int. Cl.[7] .......................... C09D 11/02; B32B 27/14; B41J 2/01
(52) U.S. Cl. .................... 106/31.48; 534/751; 534/756; 347/100
(58) Field of Search ....................... 106/31.48; 534/751, 534/756; 347/100; 428/195.1

(56) References Cited

U.S. PATENT DOCUMENTS

| | | | | |
|---|---|---|---|---|
| 2,140,539 A | * | 12/1938 | Dickey et al. ............... | 534/756 |
| 3,341,512 A | * | 9/1967 | Wegmuller et al. .......... | 534/756 |
| 3,726,851 A | * | 4/1973 | Litke ........................... | 534/775 |
| 4,062,836 A | * | 12/1977 | Liechti et al. ............... | 534/756 |
| 4,071,312 A | * | 1/1978 | Blackwell ...................... | 8/648 |
| 4,285,861 A | | 8/1981 | Brode et al. ................. | 534/728 |
| 4,667,020 A | * | 5/1987 | Etzbach et al. .............. | 534/756 |
| 4,668,774 A | | 5/1987 | Loeffler et al. .............. | 534/728 |
| 5,746,821 A | * | 5/1998 | Hays ........................... | 106/496 |
| 6,077,339 A | | 6/2000 | Nyssen et al. ............ | 106/31.77 |
| 2004/0089198 A1 | * | 5/2004 | Millard et al. ............ | 106/31.48 |

FOREIGN PATENT DOCUMENTS

| | | |
|---|---|---|
| EP | 0 163 113 | 4/1985 |
| FR | 2128330 | 10/1972 |
| GB | 1 429 801 | 3/1976 |
| WO | WO 00/43451 | 7/2000 |

* cited by examiner

*Primary Examiner*—Helene Klemanski
(74) *Attorney, Agent, or Firm*—Morgan, Lewis & Bockius LLP

(57) ABSTRACT

A process for coloration of a substrate comprising applying thereto means of an ink jet printer a composition comprising a medium and a compound of Formula (1):

Formula (1)

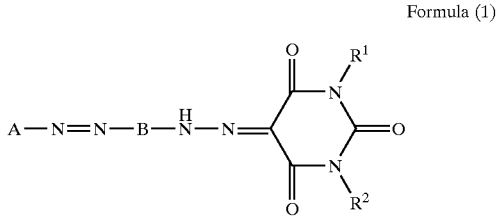

wherein:
A is optionally substituted aryl;
B is optionally substituted arylene; and
$R^1$ and $R^2$ are each independently H or optionally substituted alkyl. Also claimed are novel compounds, compositions and ink-jet cartridges for use an ink-jet printer and substrate printed with an ink-jet printer.

13 Claims, No Drawings

AZO DYES CONTAINING A BARBITURIC ACID MOIETY, INK-JET PRINTING INKS AND PROCESSES

This invention relates to compounds, to compositions containing these compounds, to inks, to printing processes, to printed substrates and to ink-jet printer cartridges.

Ink-jet printing (IJP) is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water, light and ozone fastness and high optical density. The inks are often required to dry quickly when applied to a substrate to prevent smudging, but they should not form a crust over the tip of an ink-jet nozzle because this will stop the printer from working. The inks should also be stable to storage over time without decomposing or forming a precipitate which could block the fine nozzle.

A particular problem for photorealistic quality printing is that of light-fastness. Prints are often exposed to daylight for long periods and there is a need for the image to have as good light-fastness as possible. However, at the same time ink-jet photorealistic quality prints have to compete with silver halide photography and so the dyes used in IJP inks cannot be unduly expensive. The colorants in the print reacting with atmospheric ozone can play a major role in poor light-fastness.

This invention relates to colorants suitable for use in ink-jet printing inks and ink-jet printing processes with improved ozone-fastness and light-fastness.

According to the present invention there is provided a process for coloration of a substrate comprising applying thereto by means of an ink jet printer a composition comprising a medium and a compound of Formula (1):

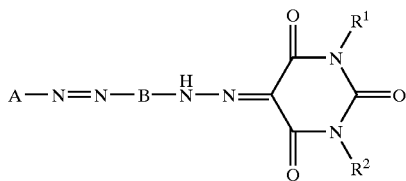

Formula (1)

wherein:
A is optionally substituted aryl;
B is optionally substituted arylene; and
$R^1$ and $R^2$ are each independently H or optionally substituted alkyl.

The ink-jet printer preferably applies the composition to the substrate in the form of droplets which are ejected through a small orifice onto the substrate. Preferred ink-jet printers are piezoelectric inkjet printers and thermal ink-jet printers. In thermal ink-jet printers, programmed pulses of heat are applied to the composition in a reservoir by means of a resistor adjacent to the orifice, thereby causing the composition to be ejected in the form of small droplets directed towards the paper during relative movement between the substrate and the orifice. In piezoelectric ink-jet printers the oscillation of a small crystal causes ejection of the composition from the orifice. Alternately the ink can be ejected by an electromechanical actuator connected to a moveable paddle or plunger as for example described in WO 00/48938 and WO 00/55089.

The substrate is preferably paper, plastic, a textile, metal or glass more preferably paper, an overhead projector slide or a textile material, especially paper.

Preferred papers are plain, coated or treated papers which may have an acid, alkaline or neutral character.

Preferably A is optionally substituted phenyl or optionally substituted naphthyl.

Preferably B is optionally substituted phenylene or optionally substituted naphthylene. More preferably A is optionally substituted phenyl and B is optionally substituted phenylene.

Preferred optional substituents which may independently be present on A or B are optionally substituted alkyl (preferably $C_{1-4}$-alkyl), optionally substituted alkoxy (preferably $C_{1-4}$-alkoxy), optionally substituted aryl (preferably phenyl), optionally substituted aryloxy (preferably phenoxy), polyalkylene oxide (preferably polyethylene oxide or polypropylene oxide), carboxy, phosphato, sulpho, nitro, cyano, halo, ureido, $SO_2F$, hydroxy, ester, $—NR^3R^4$, $—COR^3$, $—CONR^3R^4$, $—NHCOR^3$, carboxyester, sulphone, and $—SO_2NR^3R^4$ wherein $R^3$ and $R^4$ are each independently H or optionally substituted alkyl (especially $C_{1-4}$-alkyl).

More preferably the optional substituents which may independently be present on A or B are each independently; methyl, ethyl, propyl, butyl, phenyl, methoxy, ethoxy, butoxy, carboxy, phosphato, sulpho, nitro, phenoxy, cyano, carboxyester, sulphone, sulphonamide, ureido, $SO_2NR^3R^4$ or $NHCOR^3$ groups wherein $R^3$ and $R^4$ are as hereinbefore defined.

When A is optionally substituted naphthyl or B is optionally substituted naphthylene then preferably A and/or B carry one or more (preferably 1 to 4) substituents selected from hydroxy, amino, sulpho and carboxy.

When A is optionally substituted phenyl or B is optionally substituted phenylene then preferably A and/or B carry at least one substituent selected from hydroxy, phosphato, amino, sulpho and carboxy. More preferably when A is optionally substituted phenyl or B is optionally substituted phenylene then A and B each independently carry at least one carboxy or sulpho substituent.

Preferably $R^1$ and $R^2$ are each independently H or $C_{1-4}$-alkyl, more preferably $R^1$ and $R^2$ are H.

Preferably compounds of Formula (1) have 1, 2 or 3 water-dispersing substituents. Preferred water-dispersing substituents are polyalkylene oxides, sulpho, phosphato and carboxy, more preferably sulpho and carboxy.

Preferred polyalkylene oxide groups are poly($C_{2-3}$-alkylene oxide) groups, more preferably polyethylene glycol and polypropylene glycol, preferably having from 1 to 20 glycol units and terminated with a hydroxy or $C_{1-4}$-alkoxy group.

Preferably the compounds of Formula (1) are water-soluble.

Preferably the compounds of Formula (1) do not contain groups reactive towards textiles.

It is also preferred that compounds of Formula (1) are disazo.

In view of the foregoing preferences, a preferred compound of Formula (1) is of Formula (2) as hereinafter described.

Any acid or basic groups on the compound are preferably in the form of a salt. Thus the Formulae shown herein include the compounds in free acid and in salt form.

Preferred salts are alkali metal salts, especially lithium, sodium and potassium, ammonium and substituted ammonium salts (including quaternary amines such as $((CH_3)_4N^+)$ and mixtures thereof. Especially preferred are salts with sodium, lithium, ammonia and volatile amines, more especially sodium salts. The compounds may be converted into a salt using known techniques.

The compounds of Formula (1) and (2) may exist in tautomeric forms other than those shown in this specification. These tautomers are included within the scope of the present invention.

Preferably the composition comprises:
(a) from 0.01 to 30 parts of a compound of Formula (1) as hereinbefore defined, preferably of Formula (2) as hereinafter described; and
(b) from 70 to 99.99 parts of a medium;
wherein all parts are by weight and the number of parts of (a)+(b)=100.

Preferably the medium is a liquid medium.

The number of parts of component (a) is preferably from 0.1 to 20, more preferably from 0.5 to 15, especially from 1 to 5 parts. The number of parts of component (b) is preferably from 99.9 to 80, more preferably from 99.5 to 85, especially from 99 to 95 parts.

The composition may of course contain further ingredients in addition to (a) and (b).

Preferably component (a) is completely dissolved in component (b). Preferably component (a) has a solubility in component (b) at 20° C. of at least 10%. This allows the preparation of liquid concentrates which may be used to prepare more dilute inks and also reduces the chance of component (a) precipitating if evaporation of the liquid medium occurs during storage.

Preferred liquid media include water, a mixture of water and organic solvent and organic solvent free from water.

When the liquid medium comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably pentane-1,5-diol, diethylene glycol, triethylene glycol, polyethylene glycol and polypropylene glycol; triols, preferably glycerol and 1,2,6-hexanetriol; mono-$C_{1-4}$-alkyl ethers of diols, preferably mono-C-4-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy) ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially pentane-1,5-diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Although not necessary, further colorants may be added to the composition medium to modify the shade and performance properties of the composition. Examples of such colorants include C.I. Direct Yellow 86, 132, 142 and 173; C.I. Direct Blue 199, and 307; C.I. Food Black 2; C.I. Direct Black 168 and 195; C.I. Acid Yellow 23; and any of the dyes used in ink-jet printers sold by Seiko Epson Corporation, Hewlett Packard Company, Canon Inc. & Lexmark International. Addition of such further colorants can increase overall solubility leading to less kogation (nozzle blockage) for the resultant composition.

It particularly preferable to add C.I. Direct Yellow 173 to the composition.

Examples of further suitable liquid media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises organic solvent free from water, (i.e. less than 1% water by weight) the solvent preferably has a boiling point of from 300 to 200° C., more preferably of from 400 to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the medium is organic solvent free from water it is a mixture of 2 to 5 different organic solvents. This allows a medium to be selected which gives good control over the drying characteristics and storage stability of the composition.

Liquid media comprising organic solvent free from water are particularly useful where fast drying times are required and particularly when printing onto hydrophobic and non-absorbent substrates, for example plastics, metal and glass.

Preferably the composition has been filtered through a filter having a mean pore size below 10 $\mu$m, more preferably below 3 $\mu$m, especially below 2 $\mu$m, more especially below 1 $\mu$m. This filtration removes particulate matter which could otherwise block the fine nozzles found in many ink-jet printers.

Preferably the composition contains less than 500 ppm, more preferably less than 250 ppm, especially less than 100 pm, more especially less than 10 ppm in total of halide ions.

The composition preferably has a total concentration of divalent and trivalent metal ions of below 1000, more preferably below 500, especially below 100, more especially below 20 and particularly below 10 parts per million by weight relative to the total weight of the composition (other than any divalent and trivalent metal ions bound to a component of the ink). Pure compositions of this type may be prepared by using high purity ingredients and/or by purifying the composition after it has been prepared. Suitable purification techniques are well known, e.g. ultrafiltration, reverse osmosis, ion exchange and combinations thereof.

Thus a particularly preferred composition is one which contains less than 1000 ppm divalent and trivalent metal ions (other than any divalent and trivalent metal ions bound to a component of the ink) and which has been filtered through a filter having a mean pore size below 10 μm.

An especially preferred composition is one which contains less than 1000 ppm divalent and trivalent metal ions (other than any divalent and trivalent metal ions bound to a component of the ink), less than 500 ppm halide ions and which has been filtered through a filter having a mean pore size below 10 μm.

The liquid medium may also of course contain further additives which are conventionally used in ink-jet printing inks, for example viscosity and surface tension modifiers, corrosion inhibitors, biocides, kogation reducing additives and surfactants which may be ionic or non-ionic.

A second aspect of the present invention provides a substrate, especially paper, an overhead projector slide, a textile material, a plastic, glass and metal, printed by a process according to a first aspect of the invention. Preferably the substrate is paper.

Preferred papers are plain, coated or treated papers which may have an acid, alkaline or neutral character.

According to a third aspect of the invention there is provided a composition comprising a compound of Formula (1), as hereinbefore defined, and a medium which comprises a mixture of water and organic solvent or organic solvent free from water wherein said composition has a total concentration of divalent and trivalent metal ions of below 1000 parts per million by weight relative to the total weight of the composition (other than any divalent and trivalent metal ions bound to a component of the ink) and/or has less than 500 ppm halide ions and/or has been filtered through a filter having a mean pore size below 10 μm.

The composition preferably has a total concentration of divalent and trivalent metal ions of below 500, more preferably below 100, especially below 20 and more especially below 10 parts per million by weight relative to the total weight of the composition (other than any divalent and trivalent metal ions bound to a component of the ink).

Preferably the composition has been filtered through a filter having a mean pore size below 3 μm, more preferably below 2 μm and especially below 1 μm.

Preferably the composition contains less than 250 ppm, more preferably less than 100 ppm and especially less than 10 pmin total of halide ions.

Preferably the compound of Formula (1) is of Formula (2) as hereinafter defined.

Preferred mixtures of water and organic solvent and organic solvent free from water are as described in the first aspect of the invention.

Compositions according to the third aspect of the invention are preferably prepared using high purity ingredients and/or by purifying the composition after it has been prepared. Suitable purification techniques are well known, e.g. ultrafiltration, reverse osmosis, ion exchange and combinations thereof (either before or after they are incorporated in a composition according to the present invention). This purification results in the removal of substantially all of the inorganic salts and by-products resulting from its synthesis. Such purification assists in the preparation of a low viscosity aqueous solution suitable for use in an ink jet printer.

Preferably the composition is an ink-jet printing ink or a liquid dye concentrate. Concentrates are useful as a means for transporting colorant and so minimising costs associated with drying the compound and transporting excess liquid.

A fourth aspect of the invention provides a compound of Formula (1) provided it comprises at least one carboxy group or of Formula (2) or Formula (3):

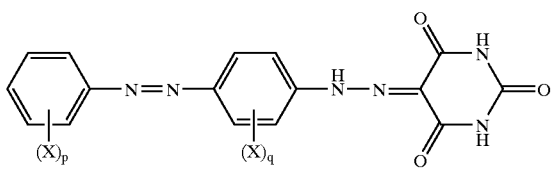

Formula (2)

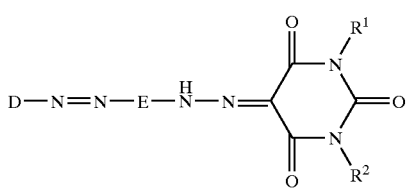

Formula (3)

wherein:
X is a water-dispersing substituent;
p is 1 to 5;
q is 0 to 4;
D is optionally substituted napthyl;
E is optionally substituted phenylene; and
$R^1$ and $R^2$ are each independently H or optionally substituted alkyl.

Preferably each X independently is sulpho or carboxy.
Preferably p is 1 or 2.
Preferably q is 0 or 1.
D preferably carries at least one water-dispersing substituent, more preferably D carries at least one sulpho and/or one carboxy.

A fifth aspect of the present invention provides an ink jet printer cartridge comprising a chamber and a composition wherein the composition is in the chamber and the composition is as described in the third aspect of the present invention.

The invention is further illustrated by the following Examples in which all parts and percentages are by weight unless otherwise stated.

EXAMPLE 1

Preparation of:

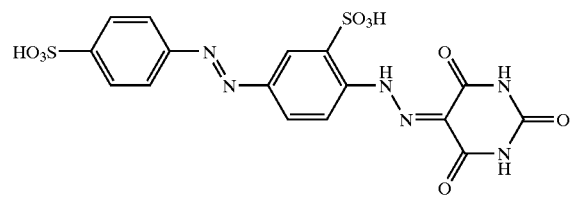

C.I. Acid Yellow 9 (4 g) was dissolved in water (150 ml) at pH 6. The solution was cooled to 0–5° C. and concentrated hydrochloric acid (5 ml) was added followed by sodium nitrite (0.8 g) and the suspension was stirred for 30 minutes at 5° C. Sulphamic acid (0.5 g) was then added and the mixture poured into a beaker containing barbituric acid (1.3 g) dissolved in water (150 ml) at 5° C. The pH was adjusted to between pH 5–6 with 2 mol dm$^{-3}$ sodium hydroxide solution. After stirring for 2 hours the reaction was complete. The precipitate was collected by filtration, washed with a small amount of water, and dried to give a yellow solid which when dissolved in water had a $\lambda_{max}$=417 nm and $\epsilon_{max}$=40,000 dm$^3$ mol$^{-1}$ cm$^{-1}$.

EXAMPLE 2

Preparation of:

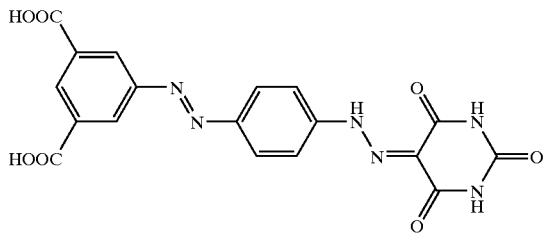

Sulphuric acid (20 ml) was stirred at 0–10° C. and sodium nitrite (0.8 g) added step wise. 4-Amino-3',5'-dicarboxyazobenzene (4 g) was then added, followed by a 86:14 acetic:propionic acid mixture (20 ml). The mixture was stirred at between 0 to 10° C. for 1 hour. The resulting suspension was then added to a stirred solution of barbituric acid (1.3 g), sulphamic acid (0.5 g) and water (150 ml) at between 0 to 10° C. The pH was adjusted to between pH 5–6 with 2 mol dm$^{-3}$ sodium hydroxide solution and the solution stirred for 2 hours to complete the reaction. Sodium chloride was added to precipitate the title product. This precipitate was collected by filtration and dried to give a yellow solid which when dissolved in water had a $\lambda_{max}$=425 nm and $\epsilon_{max}$=31,000 dm$^3$ mol$^{-1}$ cm$^{-1}$.

EXAMPLE 3

Preparation of:

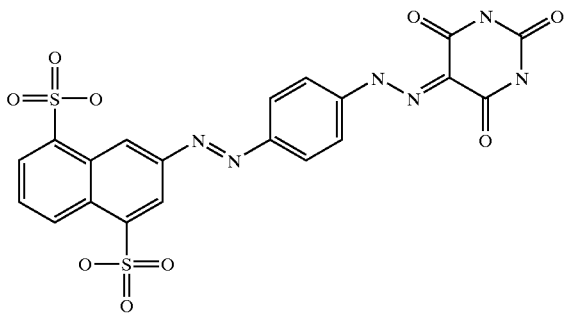

3-(4-amino-phenylazo)-naphthalene-1,5-disulphonic acid (13 g) was dissolved in water (300 ml) at pH 7. Sodium nitrite (1.8 g) was added. The solution was cooled to 0–5° C. and concentrated hydrochloric acid (8 ml) was added and the suspension was stirred for 30 minutes at 5° C. Sulphamic acid (0.5 g) was then added and the mixture poured into a beaker containing barbituric acid (3.6 g) and dissolved in water (150 ml) at 5° C. The pH was adjusted to between pH 5–6 using sodium carbonate solution. After stirring for 2 hours the reaction was complete. The resultant precipitate was collected by filtration, washed with a small amount of water, and dried to give a yellow solid which when dissolved in water had a $\lambda_{max}$=422 nm and $\epsilon_{max}$=31,000 dm$^3$ mol$^{-1}$ cm$^{-1}$.

EXAMPLE 4

Preparation of:

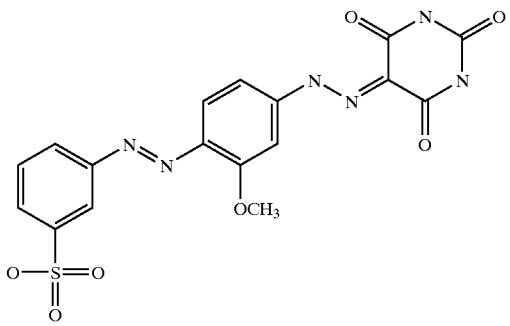

3-(4-amino-2-methoxyphenylazo)benzene sulphonic acid (9.5 g) was dissolved in water (300 ml) at pH 7. Sodium nitrite (2.0 g) was added. The solution was cooled to 0–5° C. and concentrated hydrochloric acid (10 ml) was added and the suspension was stirred for 60 minutes at 5° C. Sulphamic acid (0.5 g) was then added and the mixture was poured into a beaker containing barbituric acid (3.8 g) dissolved in water (150 ml) at 5° C. The pH was adjusted to between pH 5–6 with sodium carbonate solution. After stirring for 2 hours the reaction was complete. The resultant precipitate was collected by filtration, washed with a small amount of water, and dried to give a yellow solid which when dissolved in water had a $\lambda_{max}$=432 nm and $\epsilon_{max}$=34,000 dm$^3$ mol$^{-1}$ cm$^{-1}$.

EXAMPLE 5

Preparation of:

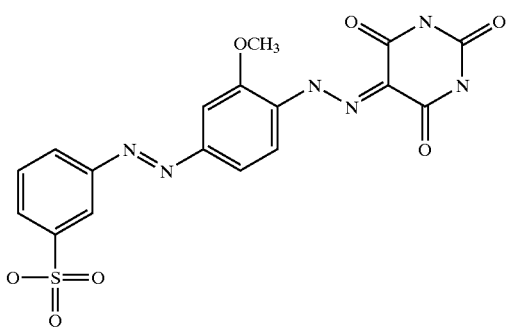

The method for the preparation of Example 4 above was employed to synthesise the above dye except that in place of 3-(4-amino-2-methoxyphenylazo)benzene sulphonic acid there was used 3-(4-amino-3-methoxyphenylazo)benzene sulphonic acid. A yellow solid was produced which, when dissolved in water, had a $\lambda_{max}$=446 nm and $\epsilon_{max}$=36,000 dm$^3$ mol$^{-1}$ cm$^{-1}$.

EXAMPLE 6

Preparation of:

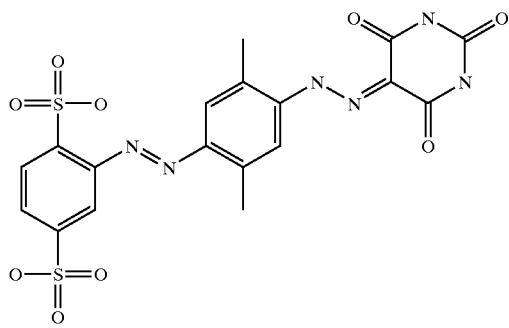

The method for the preparation of the Example 4 above was used to synthesise the above dye except that in place of 3-(4-amino-2-methoxyphenylazo)benzene sulphonic acid there was used 3-(4-amino-2,5-dimethylphenylazo) benzene-1,4-disulphonic acid. A yellow solid which when dissolved in water had a $\lambda_{max}$=441 nm and $\epsilon_{max}$=34,000 dm$^3$ mol$^{-1}$ cm$^{-1}$.

EXAMPLE 7

Preparation of Ink 1

Ink 1 was prepared by dissolving the compound of Example 1 (3 g) in 100 ml of a liquid medium consisting of 2-pyrrolidone/thiodiglycol/Surfynol™ 465 in a weight ratio of 5:5:1.

EXAMPLE 8

Preparation of Ink 2

Ink 2 was prepared by dissolving the compound of Example 1 (1.5 g) and 1.5 g of Fast Yellow 2 in 100 ml of a liquid medium consisting of 2-pyrrolidone/thiodiglycol/Surfynol™ 465 in a ratio of 5:5:1.

EXAMPLE 9

Preparation of Ink 3

Ink 3 was prepared by dissolving the compound of Example 4 (3 g) in 100 ml of a liquid medium consisting of 2-pyrrolidone/thiodiglycol/Surfynol™ 465 in a ratio of 5:5:1.

EXAMPLE 10

Ink-Jet Printing

Inks 1 to 3 were ink-jet printed onto a variety of papers using a Hewlett Packard DeskJet 550C™. The CIE colour co-ordinates of each print (a, b, L, Chroma "C" and hue "h") were measured using a Xrite 983™ Spectrodensitometer with 0°/45° measuring geometry with a spectral range of 400–700 nm at 20 nm spectral intervals, using illuminant C with a 2° (CIE 1931) observer angle and a density operation of status T. No less than 2 measurements were taken diagonally across a solid colour block on the print with a size greater than 10 mm×10 mm. The properties of the resultant prints are shown in Table 1.

TABLE 1

| Ink | Paper | % Depth | L | a | b | C | h |
|---|---|---|---|---|---|---|---|
| Ink 1 | X Acid ™ | 100% | 82 | 16 | 84 | 85 | 79 |
| Ink 1 | X Acid ™ | 50% | 86 | 7 | 72 | 72 | 85 |
| Ink 1 | Hp Printing ™ | 100% | 81 | 16 | 82 | 83 | 79 |

TABLE 1-continued

| Ink | Paper | % Depth | L | a | b | C | h |
|---|---|---|---|---|---|---|---|
| Ink 1 | Hp Printing ™ | 50% | 85 | 7 | 66 | 66 | 84 |
| Ink 1 | HR101 ™ | 100% | 81 | 17 | 97 | 99 | 80 |
| Ink 1 | HR101 ™ | 50% | 86 | 6 | 78 | 78 | 86 |
| Ink 1 | Epson PM ™ | 100% | 87 | 3 | 96 | 96 | 88 |
| Ink 1 | Epson PM ™ | 50% | 90 | -3 | 69 | 69 | 93 |
| Ink 1 | Hp Premium ™ | 100% | 84 | 13 | 94 | 95 | 82 |
| Ink 1 | Hp Premium ™ | 50% | 87 | 4 | 72 | 73 | 87 |
| Ink 1 | Kodak Picture ™ | 100% | 84 | 14 | 90 | 91 | 81 |
| Ink 1 | Kodak Picture ™ | 50% | 87 | 6 | 72 | 72 | 86 |
| Ink 2 | X Acid ™ | 100% | 84 | 11 | 81 | 82 | 83 |
| Ink 2 | X Acid ™ | 50% | 87 | 3 | 67 | 68 | 87 |
| Ink 2 | Hp Printing ™ | 100% | 84 | 9 | 79 | 80 | 83 |
| Ink 2 | Hp Printing ™ | 50% | 87 | 2 | 65 | 65 | 88 |
| Ink 2 | HR101 ™ | 50% | 87 | 1 | 79 | 79 | 89 |
| Ink 2 | HR101 ™ | 50% | 90 | -4 | 49 | 49 | 94 |
| Ink 2 | Epson PM ™ | 100% | 88 | 1 | 97 | 97 | 89 |
| Ink 2 | Epson PM ™ | 50% | 91 | -6 | 72 | 72 | 95 |
| Ink 2 | Hp Premium ™ | 100% | 85 | 9 | 101 | 102 | 85 |
| Ink 2 | Hp Premium ™ | 50% | 88 | 1 | 78 | 78 | 89 |
| Ink 2 | Kodak Picture ™ | 100% | 85 | 10 | 98 | 98 | 84 |
| Ink 2 | Kodak Picture ™ | 50% | 88 | 1 | 79 | 79 | 89 |
| Ink 3 | X Acid ™ | 100% | 70 | 40 | 73 | 83 | 61 |
| Ink 3 | X Acid ™ | 50% | 76 | 29 | 66 | 72 | 66 |
| Ink 3 | Hp Printing ™ | 100% | 69 | 40 | 70 | 81 | 60 |
| Ink 3 | Hp Printing ™ | 50% | 75 | 30 | 59 | 66 | 63 |
| Ink 3 | HR101 ™ | 100% | 69 | 44 | 88 | 98 | 64 |
| Ink 3 | HR101 ™ | 50% | 76 | 30 | 73 | 79 | 68 |
| Ink 3 | Epson PM ™ | 100% | 75 | 32 | 96 | 101 | 71 |
| Ink 3 | Epson PM ™ | 50% | 82 | 16 | 76 | 78 | 78 |
| Ink 3 | Hp Premium ™ | 100% | 69 | 43 | 94 | 103 | 66 |
| Ink 3 | Hp Premium ™ | 50% | 76 | 29 | 75 | 80 | 69 |
| Ink 3 | Kodak Picture ™ | 100% | 70 | 43 | 89 | 99 | 64 |
| Ink 3 | Kodak Picture ™ | 50% | 77 | 29 | 74 | 79 | 68 |

Light Fastness

To evaluate light fastness the prints were irradiated in an Atlas Ci35 Weatherometer for 100 hours. The results are shown in Table 2 where degree of fade is expressed as ΔE where a lower figure indicates higher light fastness. ΔE is defined as the overall change in the CIE colour co-ordinates L*, a*, b* of the print and is expressed by the equation $\Delta E=(\Delta L^2+\Delta a^2+\Delta b^2)^{0.5}$.

TABLE 2

| Ink | Paper | ΔE |
|---|---|---|
| Ink 1 | X Acid ™ | 15 |
| Ink 1 | HP Printing ™ | 21 |
| Ink 1 | HR101 ™ | 38 |
| Ink 1 | Epson PM ™ | 14 |
| Ink 1 | HP Premium ™ | 17 |
| Ink 1 | Kodak Picture ™ | 39 |
| Ink 2 | X Acid ™ | 16 |
| Ink 2 | HP Printing ™ | 20 |
| Ink 2 | HR101 ™ | 30 |
| Ink 2 | Epson PM ™ | 13 |
| Ink 2 | HP Premium ™ | 17 |
| Ink 2 | Kodak Picture ™ | 39 |
| Ink 3 | X Acid ™ | 16 |
| Ink 3 | HP Printing ™ | 22 |
| Ink 3 | HR101 ™ | 57 |
| Ink 3 | Epson PM ™ | 8 |
| Ink 3 | HP Premium ™ | 11 |
| Ink 3 | Kodak Picture ™ | 45 |

Ozone Fastness

Inks 1 to 3 were printed onto the substrate shown using a Canon 4300 IJ printer. The printed substrate was then assessed for ozone stability using an ozone test cabinet from Hampden Test Equipment. The test was carried out for two and a half hours at 40° C. and 55% relative humidity in the presence of 400 parts per hundred million of ozone. Fastness of the printed ink to ozone was judged by the difference in the optical density before and after exposure to ozone using an Xrite 983 Spectrodensitometer. Thus, the lower the loss of % OD the greater the ozone fastness. Results are shown below in Table 3 and these clearly demonstrate that inks based on dyes of this invention display good ozone fastness.

TABLE 3

| Ink | Paper | OD | % loss of OD |
|---|---|---|---|
| Ink 1 | HR101 ™ | 0.85 | 23% |
| Ink 1 | Epson PM ™ | 0.74 | 24% |
| Ink 1 | HP Premium ™ | 0.99 | 1% |
| Ink 1 | Kodak Picture ™ | 0.96 | 4% |
| Ink 2 | HR101 ™ | 1.02 | 12% |
| Ink 2 | Epson PM ™ | 1.01 | 8% |
| Ink 2 | HP Premium ™ | 1.13 | 0 |
| Ink 2 | Kodak Picture ™ | 1.17 | 3% |
| Ink 3 | HR101 ™ | 0.68 | 40% |
| Ink 3 | Epson PM ™ | 1.03 | 10% |
| Ink 3 | HP Premium ™ | 1.31 | −9% |
| Ink 3 | Kodak Picture ™ | 1.12 | 3% |

Inks and Ink-Jet Printing

The compounds described in Examples 1 and 2 may be formulated into inks by dissolving in a suitable liquid medium and filtering the solution through a 0.45 μm filter. For example a suitable ink comprises 3.5 parts of the compound in 96.5 parts of a liquid medium consisting of:

5 parts 2-pyrrolidone
5 parts thiodiglycol
2 parts Surfynol™ 465 (a non-ionic surfactant available from Air Products Inc.); and
88 parts water.

When ink-jet printed on to paper, the inks provide prints which are a bright yellow shade with a high water-fastness, good light-fastness, ozone-fastness and a high optical density.

Further Inks

The inks described in Tables I and II may be prepared wherein the Dye described in the first column is the compound made in the above example of the same number. Numbers quoted in the second column onwards refer to the number of parts of the relevant ingredient and all parts are by weight. The inks may be applied to paper by thermal or piezo ink-jet printing.

The following abbreviations are used in Table I and II:
PG=propylene glycol
DEG=diethylene glycol
NMP=N-methylpyrollidone
DMK=dimethylketone
IPA=isopropanol
MEOH=methanol
2P=2-pyrrolidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE 1

| Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 1 | 10.0 | 85 | 3 | | 3 | 3 | | | | 5 | 1 | |
| 2 | 2.1 | 91 | | 8 | | | | | | | | 1 |
| 1 | 3.1 | 86 | 5 | | | | | 0.2 | 4 | | | 5 |
| 2 | 1.1 | 81 | | | 9 | | 0.5 | 0.5 | | | 9 | |
| 1 | 2.5 | 60 | 4 | 15 | 3 | 3 | | | 6 | 10 | 5 | 4 |
| 2 | 5 | 65 | | 20 | | | | | 10 | | | |
| 1 | 2.4 | 75 | 5 | 4 | | 5 | | | | 6 | | 5 |
| 2 | 4.1 | 80 | 3 | 5 | 2 | 10 | | 0.3 | | | | |
| 1 | 3.2 | 65 | | 5 | 4 | 6 | | | 5 | 4 | 6 | 5 |
| 2 | 5.1 | 96 | | | | | | | | 4 | | |
| 1 | 10.8 | 90 | 5 | | | | | | 5 | | | |
| 2 | 10.0 | 80 | 2 | 6 | 2 | 5 | | | 1 | | 4 | |
| 3 | 1.8 | 80 | | 5 | | | | | | | 15 | |
| 4 | 2.6 | 84 | | | 11 | | | | | | 5 | |
| 1 | 3.3 | 80 | 2 | | | 10 | | | | 2 | | 6 |
| 1 | 12.0 | 90 | | | | 7 | 0.3 | | 3 | | | |
| 1 | 5.4 | 69 | 2 | 20 | 2 | 1 | | | | | 3 | 3 |
| 1 | 6.0 | 91 | | | 4 | | | | | | 5 | |

TABLE II

| Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 1 | 1.5 | 85 | 5 | 5 | | 0.15 | 5.0 | 0.2 | | | | |
| 2 | 2.5 | 90 | | 6 | 4 | | | | | 0.12 | | |
| 1 | 3.1 | 82 | 4 | 8 | | 0.3 | | | | | | 6 |
| 2 | 0.9 | 85 | | 10 | | | | | 5 | 0.2 | | |
| 1 | 8.0 | 90 | | 5 | 5 | | | 0.3 | | | | |
| 2 | 4.0 | 70 | | 10 | 4 | | | | 1 | | 4 | 11 |
| 1 | 2.2 | 75 | 4 | 10 | 3 | | | | 2 | | 6 | |

TABLE II-continued

| Example | Dye Content | Water | PG | DEG | NMP | CET | TBT | TDG | BDL | PHO | 2P | PI2 |
|---|---|---|---|---|---|---|---|---|---|---|---|---|
| 1 | 10.0 | 91 | | | 6 | | | | | | 3 | |
| 1 | 9.0 | 76 | | 9 | 7 | | 3.0 | | | 0.95 | 5 | |
| 2 | 5.0 | 78 | 5 | 11 | | | | | | | 6 | |
| 2 | 5.4 | 86 | | | 7 | | | | | | 7 | |
| 1 | 2.1 | 70 | 5 | 5 | 5 | 0.1 | 0.2 | 0.1 | 5 | 0.1 | 5 | |
| 1 | 2.0 | 90 | | 10 | | | | | | | | |
| 1 | 2 | 88 | | | | | | 10 | | | | |
| 1 | 5 | 78 | | | 5 | | | 12 | | | 5 | |
| 1 | 8 | 70 | 2 | | 8 | | | 15 | | | 5 | |
| 1 | 10 | 80 | | | | | | 8 | | | 12 | |
| | 10 | 80 | | 10 | | | | | | | | |

What is claimed is:

1. An ink-jet printing process process for coloration of a substrate comprising applying thereto by means of an ink jet printer a composition comprising a medium and a compound of Formula (1):

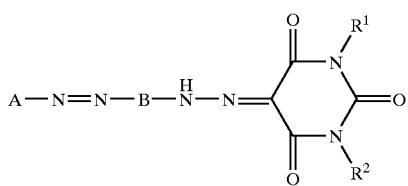

Formula (1)

wherein:
  A is optionally substituted aryl;
  B is optionally substituted arylene; and
  $R^1$ and $R^2$ are each independently H or optionally substituted alkyl.

2. An ink-jet printing process according to claim 1 wherein in the compound of Formula (1) A is optionally substituted phenyl and B is optionally substituted phenylene.

3. An ink-jet printing process according to either claim 1 or claim 2 wherein in the compound of Formula (1) $R^1$ and $R^2$ are each independently H or $C_{1-4}$-alkyl.

4. An ink-jet printing process according to claim 1 wherein the medium is a liquid medium.

5. A substrate printed by a process according to claim 1.

6. A composition comprising a compound of Formula (1) as defined in claim 1 and a medium which comprises a mixture of water and organic solvent or organic solvent free from water wherein said composition has a total concentration of divalent and trivalent metal ions of below 1000 parts per million by weight relative to the total weight of the composition.

7. A composition according to claim 6 which has been filtered through a filter having a mean pore size below 10 μm.

8. A composition according to either claim 6 or claim 7 with a total concentration of divalent and trivalent metal ions of below 100 ppm.

9. A composition according to claim 6 which is an ink-jet printing ink or a liquid dye concentrate.

10. A compound of Formula (2):

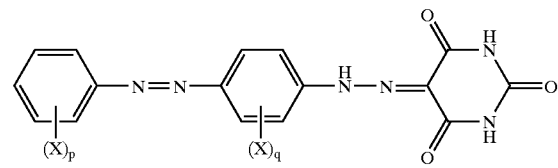

Formula (2)

wherein:
  X is a water-dispersing substituent;
  p is 1 to 5; and
  q is 0 to 4.

11. A compound according to claim 10 wherein each X independently is sulpho or carboxy.

12. An ink jet printer cartridge comprising a chamber and a composition wherein the composition is in the chamber and the composition is as described in claim 6.

13. A substrate according to claim 5 wherein the substrate is selected from the group consisting of paper, an overhead projector slide, a textile material, a plastic, glass and metal.

* * * * *